United States Patent
Steinhoff et al.

(10) Patent No.: US 6,577,481 B2
(45) Date of Patent: Jun. 10, 2003

(54) CASCODED NPN ELECTROSTATIC DISCHARGE PROTECTION CIRCUIT

(75) Inventors: Robert Steinhoff, Dallas, TX (US); Jonathan Brodsky, Richardson, TX (US); Thomas A. Vrotsos, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 69 days.

(21) Appl. No.: 10/052,845

(22) Filed: Nov. 2, 2001

(65) Prior Publication Data

US 2002/0060890 A1 May 23, 2002

Related U.S. Application Data

(60) Provisional application No. 60/246,536, filed on Nov. 7, 2000.

(51) Int. Cl.$^7$ ................................................. H02H 9/00
(52) U.S. Cl. ........................ 361/56; 361/100; 257/173; 257/355
(58) Field of Search .......................... 361/56, 100, 111, 361/58, 91; 257/173, 355, 300

(56) References Cited

U.S. PATENT DOCUMENTS

| | | | | | |
|---|---|---|---|---|---|
| 6,066,971 | A | * | 5/2000 | Pappert et al. | 327/170 |
| 6,091,594 | A | * | 7/2000 | Williamson et al. | 361/111 |
| 6,140,682 | A | * | 10/2000 | Liu et al. | 257/355 |
| 6,351,364 | B1 | * | 2/2002 | Chen et al. | 361/111 |
| 6,353,520 | B1 | * | 3/2002 | Andresen et al. | 361/56 |
| 6,430,016 | B1 | * | 8/2002 | Marr | 361/56 |
| 6,492,686 | B1 | * | 12/2002 | Pappert et al. | 257/355 |

\* cited by examiner

*Primary Examiner*—Bao Vu
(74) *Attorney, Agent, or Firm*—Alan K. Stewart; W. James Brady, III; Frederick J. Telecky, Jr.

(57) ABSTRACT

The electrostatic discharge protection circuit includes: at least two bipolar transistors Q1–Qn coupled in series; a top one Qn of the at least two bipolar transistors coupled to a protected node 10; a bottom one Q1 of the at least two bipolar transistors coupled to a common node 12; at least two resistors R1–Rn coupled in series; each of the at least two resistors is coupled to a corresponding base of one of the at least two bipolar transistors; and a bottom one R1 of the at least two resistors coupled between a base of the bottom one Q1 of the at least two bipolar transistors and the common node 12.

17 Claims, 1 Drawing Sheet

CASCODED NPN ELECTROSTATIC DISCHARGE PROTECTION CIRCUIT

This application claims priority of provisional application No. 60/246,536 filed Nov. 7, 2000.

FIELD OF THE INVENTION

This invention generally relates to electronic systems and in particular it relates to electrostatic discharge (ESD) protection.

BACKGROUND OF THE INVENTION

Achieving latch-up-free ESD protection (with minimum trigger voltage) for a pin when the only components available (including NPN transistors) individually snapback below the pin's operation voltage has been a problem in the prior art. Prior art high-voltage ESD circuits rely on stacking lower voltage 2-terminal ESD circuits. For these prior art devices, the trigger voltage of the total circuit is the sum of the individual circuit trigger voltages.

SUMMARY OF THE INVENTION

An electrostatic discharge protection circuit includes: at least two bipolar transistors coupled in series; a top one of the at least two bipolar transistors coupled to a protected node; a bottom one of the at least two bipolar transistors coupled to a common node; at least two resistors coupled in series; each of the at least two resistors is coupled to a corresponding base of one of the at least two bipolar transistors; and a bottom one of the at least two resistors coupled between a base of the bottom one of the at least two bipolar transistors and the common node.

DETAILED DESCRIPTION OF PREFERRED EMBODIMENTS

Figure 1:
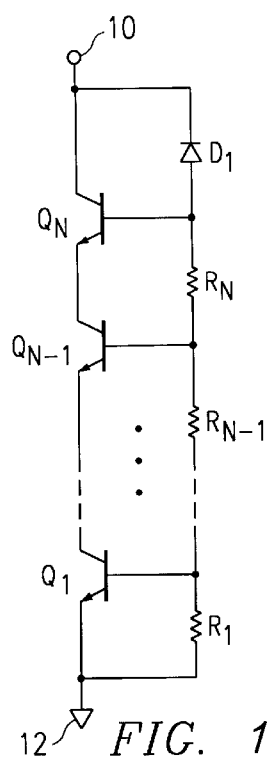
FIG. 1 is a schematic circuit diagram of a preferred embodiment cascoded NPN ESD protection circuit.

FIG. 1 shows a preferred embodiment schematic representation of the cascoded NPN ESD protection circuit. The preferred embodiment circuit of FIG. 1 includes NPN transistors $Q_1$, $Q_{n-1}$, and $Q_n$; resistors $R_1$, $R_{n-1}$, and $R_n$; diode $D_1$; ESD protected pin 10; and ground node 12. The stack of NPN transistors $Q_1-Q_n$ (which may have different sizes and styles) is connected from pin 10 to ground 12 to carry the bulk of positive ESD current. The holding/snapback voltage of this circuit is therefore the sum of the individual transistor holding/snapback voltages. These transistors $Q_1-Q_n$ are triggered through the stack of resistors $R_1-R_n$ by diode $D_1$ whose breakdown voltage determines the trigger voltage of the circuit.

In the preferred embodiment, the topmost transistor $Q_n$ is often sized larger than the other transistors since it must provide the base current to the other transistors $Q_1-Q_{n-1}$ after snapback. Also, since the top resistors carry more current prior to triggering, resistors are usually sized geometrically beginning with $R_2$: $R_i=R_2/(i-1)$ for $i>2$. $R_1$ is chosen as large as possible under transient constraints for normal circuit operation. $R_2$ is chosen as small as possible under ESD constraints involving the current-handling capabilities of the diode $D_1$ and topmost transistor $Q_n$.

Figure 2:
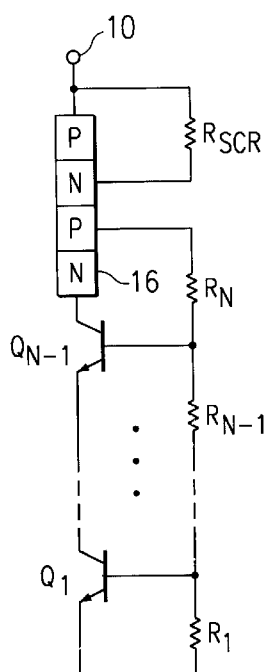
FIG. 2 is a schematic circuit diagram of a first alternative embodiment ESD protection circuit with a silicon controlled rectifier.

A first alternative embodiment ESD protection circuit with a silicon controlled rectifier (SCR) is shown in FIG. 2. The SCR 16 replaces some of the transistors and the diode $D_1$ of FIG. 1. In the circuit of FIG. 2, the resistor $R_{SCR}$ is a parasitic resistance built into the SCR 16. Alternatively, the resistor $R_{SCR}$ could be external to the SCR 16. Also, a 2-terminal circuit, such as a diode, could be placed between $R_{SCR}$ and $R_N$ to achieve lower voltage triggering.

Figure 3:
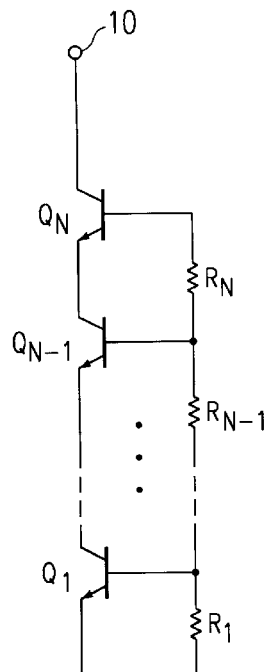
FIG. 3 is a schematic circuit diagram of a second alternative embodiment ESD protection circuit without the diode of FIG. 1.
Figure 4:
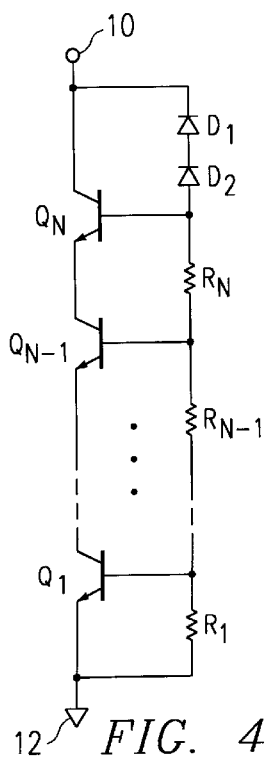
FIG. 4 is a schematic circuit diagram of a third alternative embodiment ESD protection circuit with two diodes in place of the one diode of FIG. 1.

A second alternative embodiment ESD protection circuit without the diode is shown in FIG. 3. The Circuit of FIG. 3 is the same as FIG. 1 with diode $D_1$ removed. The circuit of FIG. 3 is triggered by the collector-base breakdown of the top transistor $Q_n$. A third alternative embodiment ESD protection circuit with a stack of diodes is shown in FIG. 4. The circuit of FIG. 4 is the same as the circuit of FIG. 1 with the addition of diode $D_2$. The additional diode $D_2$ increases the trigger voltage of the circuit.

Figure 5:
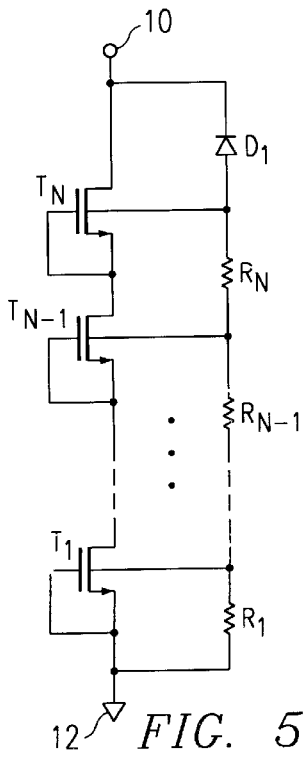
FIG. 5 is a schematic circuit diagram of a fourth alternative embodiment ESD protection circuit with NMOS transistors in place of the bipolar transistors of FIG. 1.

A fourth alternative embodiment ESD protection circuit with NMOS transistors is shown in FIG. 5. In the circuit of FIG. 5, the transistors $Q_1-Q_n$ of FIG. 1 have been replaced by NMOS transistors $T_1-T_n$. The parasitic NPN of each of the NMOS transistors $T_1-T_n$ is used in place of each bipolar transistor $Q_1-Q_n$ of FIG. 1. In FIG. 5, the gates of the NMOS transistors $T_1-T_n$ are connected to the corresponding source of each transistor. Alternatively, all of the gates of transistors $T_1-T_n$ can be connected to ground node 12, or the gates can be connected to the corresponding back gate of each transistor.

Figure 6:
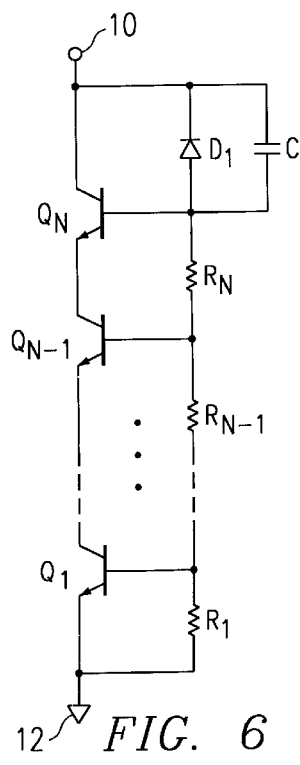
FIG. 6 is a schematic circuit diagram of a fifth alternative embodiment ESD protection circuit with a capacitor in parallel with the diode of FIG. 1.

A fifth alternative embodiment ESD protection circuit with a capacitor is shown in FIG. 6. The circuit of FIG. 6 is the same as the circuit of FIG. 1 with the addition of capacitor C in parallel with diode $D_1$. Capacitor C enhances the transient triggering.

An advantage of the preferred embodiment circuit of FIG. 1 over the prior art is that it uses a single triggering device to simultaneously turn on all NPN transistors. Without effecting the DC holding voltage (e.g. latch-up), the trigger voltage of the ESD circuits of FIGS. 1–6 is lower than that of the conventional prior art circuits which have trigger voltages determined by the sum of the individual circuit trigger voltages. Therefore, better ESD clamping is achieved because the internal circuit to be protected experiences lower over-voltage stress during ESD.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. For example, in the circuit of FIG. 1, the emitter and collector of some of the transistors $Q_1-Q_n$ can be reversed to provide a lower trigger or holding voltage. It is therefore intended that the appended claims encompass any such modifications or embodiments.

What is claimed is:

1. An electrostatic discharge protection circuit comprising:
   at least two bipolar transistors coupled in series;
   a top one of the at least two bipolar transistors coupled to a protected node;
   a bottom one of the at least two bipolar transistors coupled to a common node;
   at least two resistors coupled in series;
   each of the at least two resistors is coupled to a corresponding base of one of the at least two bipolar transistors; and
   a bottom one of the at least two resistors coupled between a base of the bottom one of the at least two bipolar transistors and the common node.

2. The circuit of claim 1 wherein the at least two bipolar transistors are NPN bipolar transistors.

3. The circuit of claim 1 further comprising a diode coupled between the protected node and a base of a top one of the at least two bipolar transistors.

4. The circuit of claim 3 wherein the at least two bipolar transistors are NPN bipolar transistors.

5. The circuit of claim 3 further comprising a capacitor coupled in parallel with the diode.

6. The circuit of claim 5 wherein the at least two bipolar transistors are NPN bipolar transistors.

7. The circuit of claim 1 further comprising at least two diodes coupled in series between the protected node and a base of a top one of the at least two bipolar transistors.

8. The circuit of claim 7 wherein the at least two bipolar transistors are NPN bipolar transistors.

9. An electrostatic discharge protection circuit comprising:
   a silicon controlled rectifier coupled to a protected node;
   at least one bipolar transistor coupled in series with the silicon controlled rectifier;
   a bottom one of the at least one bipolar transistor coupled to a common node;
   at least two resistors coupled in series;
   a top one of the at least two resistors coupled between the silicon controlled rectifier and a corresponding base of one of the at least one bipolar transistor; and
   a bottom one of the at least two resistors coupled between a base of the bottom one of the at least one bipolar transistor and the common node.

10. The circuit of claim 1 wherein the at least one bipolar transistor is an NPN bipolar transistor.

11. An electrostatic discharge protection circuit comprising:
    at least two MOS transistors coupled in series;
    a top one of the at least two MOS transistors coupled to a protected node;
    a bottom one of the at least two MOS transistors coupled to a common node;
    at least two resistors coupled in series;
    each of the at least two resistors is coupled to a corresponding back gate of one of the at least two MOS transistors; and
    a bottom one of the at least two resistors coupled between a back gate of the bottom one of the at least two MOS transistors and the common node.

12. The circuit of claim 11 wherein the at least two MOS transistors are NMOS transistors.

13. The circuit of claim 11 wherein a gate of each of the at least two MOS transistors is coupled to a corresponding source of each of the at least two MOS transistors.

14. The circuit of claim 11 wherein a gate of each of the at least two MOS transistors is coupled to the corresponding back gate of each of the at least two MOS transistors.

15. The circuit of claim 13 wherein the at least two MOS transistors are NMOS transistors.

16. The circuit of claim 11 further comprising a diode coupled between the protected node and a back gate of the top one of the at least two MOS transistors.

17. The circuit of claim 16 wherein the at least two MOS transistors are NMOS transistors.

* * * * *